(12) United States Patent
Granjeon

(10) Patent No.: US 7,043,367 B2
(45) Date of Patent: May 9, 2006

(54) MODELLING METHOD FOR FORMING A MODEL SIMULATING MULTILITHOLOGIC FILLING OF A SEDIMENTARY BASIN

(75) Inventor: Didier Granjeon, Rueil Malmaison (FR)

(73) Assignee: Institut Francais Du Petrole, Rueil-Malmaison Cedex (FR)

( * ) Notice: Subject to any disclaimer, the term of this patent is extended or adjusted under 35 U.S.C. 154(b) by 241 days.

(21) Appl. No.: 10/737,781

(22) Filed: Dec. 18, 2003

(65) Prior Publication Data
US 2004/0267454 A1 Dec. 30, 2004

(30) Foreign Application Priority Data
Dec. 20, 2002 (FR) .................................. 02 16456

(51) Int. Cl.
*G01V 3/00* (2006.01)
(52) U.S. Cl. .............................................. 702/2; 703/6
(58) Field of Classification Search .................. 702/2, 702/1–14, 17; 324/339; 345/423; 367/72; 434/299
See application file for complete search history.

(56) References Cited

U.S. PATENT DOCUMENTS

| | | | | |
|---|---|---|---|---|
| 5,220,504 | A * | 6/1993 | Holzhausen et al. | 702/12 |
| 5,466,157 | A * | 11/1995 | Henderson et al. | 434/299 |
| 5,790,434 | A * | 8/1998 | Sutton et al. | 703/6 |
| 5,844,799 | A * | 12/1998 | Joseph et al. | 702/2 |
| 6,205,402 | B1 * | 3/2001 | Lazaar et al. | 702/2 |
| 6,597,995 | B1 * | 7/2003 | Cornu et al. | 702/17 |
| 6,615,139 | B1 * | 9/2003 | Chakravarthi | 702/2 |

OTHER PUBLICATIONS

Jan C. Rivenaes; "Application of a dual-lithology, depth-dependent diffusion equation in stratigraphic simulation"; 1992; pp. 133-146.
David T. Lawrence; Mark Doyle and Thomas Aigner; "Statigraphic Simulation of Sedimentary Basins: Concepts and Calibration"; Mar. 1990; pp. 273-295.
P.M. Kenyon and D.L. Turcotte; "Morphology of a delta prograding by bulk sediment transport"; Nov. 1985; pp. 1457-1465.

* cited by examiner

*Primary Examiner*—Bryan Bui
*Assistant Examiner*—Victor J. Taylor
(74) *Attorney, Agent, or Firm*—Antonelli, Terry, Stout and Kraus, LLP.

(57) ABSTRACT

A method for forming a 2D or 3D diffusive type model allowing simulation of multilithologic filling of a sedimentary basin over geologic periods. The model is based on the numerical simulation of the evolution of a sedimentary basin, from the past to the present, in a series of time intervals. In each time interval, three major phenomena interact and are numerically modelled: basin deformation, sediment supply and transportation of these sediments in the deformed basin. To model sediment transportation, long-term permanent transportation (creeping, slow diffusion process, etc.), short-term transportation (due to rain and flood) and catastrophic transportation (notably due to cliff collapse) are taken into account using an exponential water velocity model.

6 Claims, 2 Drawing Sheets

Long-term sediment transportation

Short-term sediment transportation

Catastrophic sediment transportation

MODELLING METHOD FOR FORMING A MODEL SIMULATING MULTILITHOLOGIC FILLING OF A SEDIMENTARY BASIN

BACKGROUND OF THE INVENTION

1. Field of the Invention

The present invention is a method for forming a model simulating sedimentary filling of basins over large time and space scales.

The method according to the invention more particularly relates to the formation of a numerical stratigraphic model allowing two or three-dimensional (2D or 3D) simulation of the multilithologic filling of a basin in order to simulate the stratigraphic response of the sedimentary system to variations in time of the eustasy, the subsidence, the sediment supply and the physical parameters governing sediment transportation in the basin.

2. Description of the Prior Art

The advances recently made in geology, which gave birth during the last twenty years to seismic stratigraphy, then to genetic stratigraphy, have deeply modified the understanding of the history of sedimentary filling of basins over substantial time and space by showing the crucial influence of three main parameters: eustasy, tectonics and sedimentary flow.

Many models and notably deterministic numerical models have been formed in order to apprehend the geometric and lithologic implications of these new approaches.

These numerical models simulate the transportation and the sedimentation (or the erosion) of sediments in the basin and are based on a description of the nature, from an estimation of the eustasy, the subsidence and the sediment supply. Eustasy is the variation of the surface of the oceans simultaneously observed on all of the earth's surface, and subsidence is the absolute displacement in time of the bottom of a sedimentary basin in relation to a fixed reference level. These models thus allow testing the influence of various concepts (relationship between climate and eustasy, etc.) on the layout of the sedimentary units. Furthermore, applied to real cases, these models allow testing the coherence of the parameters introduced in the model, such as the eustatic and tectonic variations, and to reinforce the geologic interpretation of the studied basin.

A model is expected to define the main facies variation tendencies (variation of the sand/clay ratio, carbonate content, etc.) within the genetic units. It is therefore necessary to design a multilithologic modelling. The model must be able to simulate the transportation and the sedimentation of various siliciclastic (sand, clay, etc.) and carbonate (reef, carbonate deep-sea ooze, bioclasts, etc.) lithologies so that these facies variation tendencies are a result of the model, independent of geologic a priorisms such as sandy alluvial plain and clayey marine domain. In this ideal model, the siliciclastic sediments are carried along by rivers and ocean currents into the basin, whereas the carbonates are produced in marine domains, taking into account the bathymetry, the turbidity of the water and the action of the waves. After being carried along to the basin boundaries or produced in the basin, the sediments are transported, then sedimented.

There are three main deterministic model families which govern sediment transportation:
the particulate models based on the solution of the movement of particles (calculation of the flow of water, then relation between water flow and sediment flow),
the diffusive models based on a diffusion equation where the definition of the diffusion coefficient is refined (taking account of several lithologies, of the water flow, of the deposit environment, etc.), and
the geometric models based on a definition of the geometric profile of the deposit environments (length and slope of the alluvial plain, etc.) or on a geometric definition of the sedimentation rate (exponential decrease in marine domains, etc.).

The particulate models use a careful description of the sedimentary processes and are therefore as chaotic as nature. They essentially allow obtaining simulations on reservoir scale (length of the order of 0.5 to 50 km and duration of the order of 5 to 500 ka). The diffusive and geometric models both provide rough approximations of natural processes. They are much more stable than the reality they account for, but they provide only a smoothed estimation of nature. These models are preferably applicable on basin scale (length of the order of 10 to 1000 km and duration of the order of 0.1 to 100 Ma). The geometric models, based on an approximation of the basin setting, are essentially applicable in simple 2D cases wherein the subsidence, the nature of the sediments and the climate do not disturb the definition of the equilibrium profile too much. More general, the diffusive models, based on an approximation of the physics of the sediments, are applicable in 3D and can deal with transportation and sedimentation of multiple lithologies.

Various known diffusive models are for example described by:
Kenyon and Turcotte, 1985, Morphology of a Delta Prograding by Bulk Sediment Transport. In Geol. Soc. Amer. Bull., 96, 1457–1465,
Begin, Z. B., 1988, Application of a Diffusion-Erosion Model to Alluvial Channels which Degrad Due to Base-Level Lowering. Earth Surface Processes and Landforms, 13, 487–500,
Rivenaes, J. C., 1988, Application of a Dual-Lithology Depth-Dependent Diffusion Equation in Stratigraphic Simulation. Basin Research, 4, 133–146.

One advantage of diffusive models is that they allow returning to geologic concepts by quantifying certain relations such as the variable duration of the progradation and retrogradation stages of the genetic units, or the evolution of the sandiness as a function of either the bathymetry, or the prograding or retrograding tendency of the longshore.

The goal of the prior models is essentially a numerical approximation of theoretical concepts along profiles in 2D.

French patent 2,744,224 filed by the assignee describes a method for simulating the filling of a sedimentary basin. From known data on the architecture of a basin and from measured data: well logs, seismic surveys, etc., a set of input data is formed, which relates to the accommodation created by subsidence and eustasy, to the supply and production of fluvial or marine sediments, and to physical transportation parameters such as diffusion coefficients of the various lithologies. This data set is applied to a numerical model. The results, that can be deduced on the geometry and the lithologies of the sedimentary units, are compared with the measured data and the input data are refined step by step by inversion.

SUMMARY OF THE INVENTION

The modelling method according to the invention allows forming a diffusive type deterministic model (in 2D or 3D) simulating the multilithologic filling of a sedimentary basin. It comprises, from known field data relative to the architecture of the basin and from measured data such as well log data or seismic data, forming a set of input data relative to an accommodation available through subsidence and eustasy, to the supply of fluvial or marine sediments and the transportation thereof, and to physical parameters such as diffusion coefficients of the various lithologies, by means of an iterative process involving gridding of the basin into grid cells of regular dimensions; modelling according to an explicit finite-volume scheme with constant time intervals, so as to simulate the flow of each lithology deposited on each grid cell; comparing the simulation results with the field data and modifying the input data step by step and by inversion.

The method of the invention relates to the formation of a numerical deterministic diffusive type model allowing 2D or 3D simulation of the filling of sedimentary basins by siliclastic and carbonate sediments.

The method comprises, in each time interval and for each lithology:
modelling by deterministic equations respectively:
(1) the mean of the transportation processes acting on a permanent and continuous basis in the long term (more than a few years),
(2) the mean of the transportation processes acting on a permanent and continuous basis in the short term (of the order of a few days to a few months),
(3) the mean of the transportation processes acting in a catastrophic way in the very short term (of the order of a few hours to a few days), and
determining the resulting stratigraphy of the basin by taking account of the mass conservation.

The method comprises for example:
modelling long-term flows of sediments carried along by water by accounting for a model of distribution of the water flows in the basin and of the sediment transportation capacity of such flows;
modelling short-term flows of sediments carried along by water using an exponential model for estimating the water velocity; and
modelling catastrophic flows carried along by water in unstable zones located by applying a critical slope criterion.

The diffusive model obtained by means of the method allows apprehending in 3D the mulilithologic filling of a basin. In order to apply it to an industrial context, a parameter inversion methodology is used. Analysis of the available data, such as well or seismic data, allows estimation of a first set of parameters (eustasy, subsidence, sediment supply, etc.) required by the model. The diffusive model is then used to obtain a first basin simulation. This simulation is compared with the data. The parameters are then modified in order to reduce the differences between data and simulation. This inversion loop (simulation—comparison—modification) is continued and allows progressive refinement of the quantification of each parameter. At the end of this inversion loop, the user of the model thus has a simulation calibrated on the available data, as well as a set of physical parameters improving his knowledge of the basin studied.

Since modelling is carried out in a detailed way depending on the transportation types, a more precise distribution of the sediments within each geometry and a finer quantification of each one are obtained.

The main applications of the diffusive model and of its inversion loop according to the invention are:
quantification of the physical and geologic parameters (eustasy, subsidence, sediment source location, transportation parameters, etc.) for various geologic models, which allows to:
testing the coherence of various geologic models;
determining the best correlation scheme between different wells;
determining the best seismic data interpretation,
reconstituting the evolution in time of the stratigraphy of a sedimentary basin, which allows in particular:
estimating the extension and the connectivity of the various sedimentary units, or
estimating the regional distribution of the sedimentary facies.

In exploration, the model thus formed allows identifying the potentially interesting regions through location and characterization of the sedimentary layers containing the mother rocks, the drain holes, the reservoirs and/or the overlying beds. Furthermore, reservoir engineers can determine, from the model, the petrophysical properties of a reservoir studied (mean porosity and permeability) and select the most prospective production zones.

BRIEF DESCRIPTION OF THE DRAWINGS

Other features and advantages of the method according to the invention will be clear from reading the description hereafter of a non limitative embodiment example, with reference to the accompanying drawings wherein.

DETAILED DESCRIPTION OF THE INVENTION

The modelling method according to the invention allows obtaining a deterministic stratigraphic simulation over great lengths of time (of the order of ten thousand to millions of years) and over large distances (several tens to hundreds of kilometers), in 3D.

The sediments present in the basin studied can be defined by means of base lithologies. A lithology corresponds to a size grade and to a nature of grains. Coarse-grained sand, fine clays, medium carbonates can thus be distinguished for example.

Figure 1:
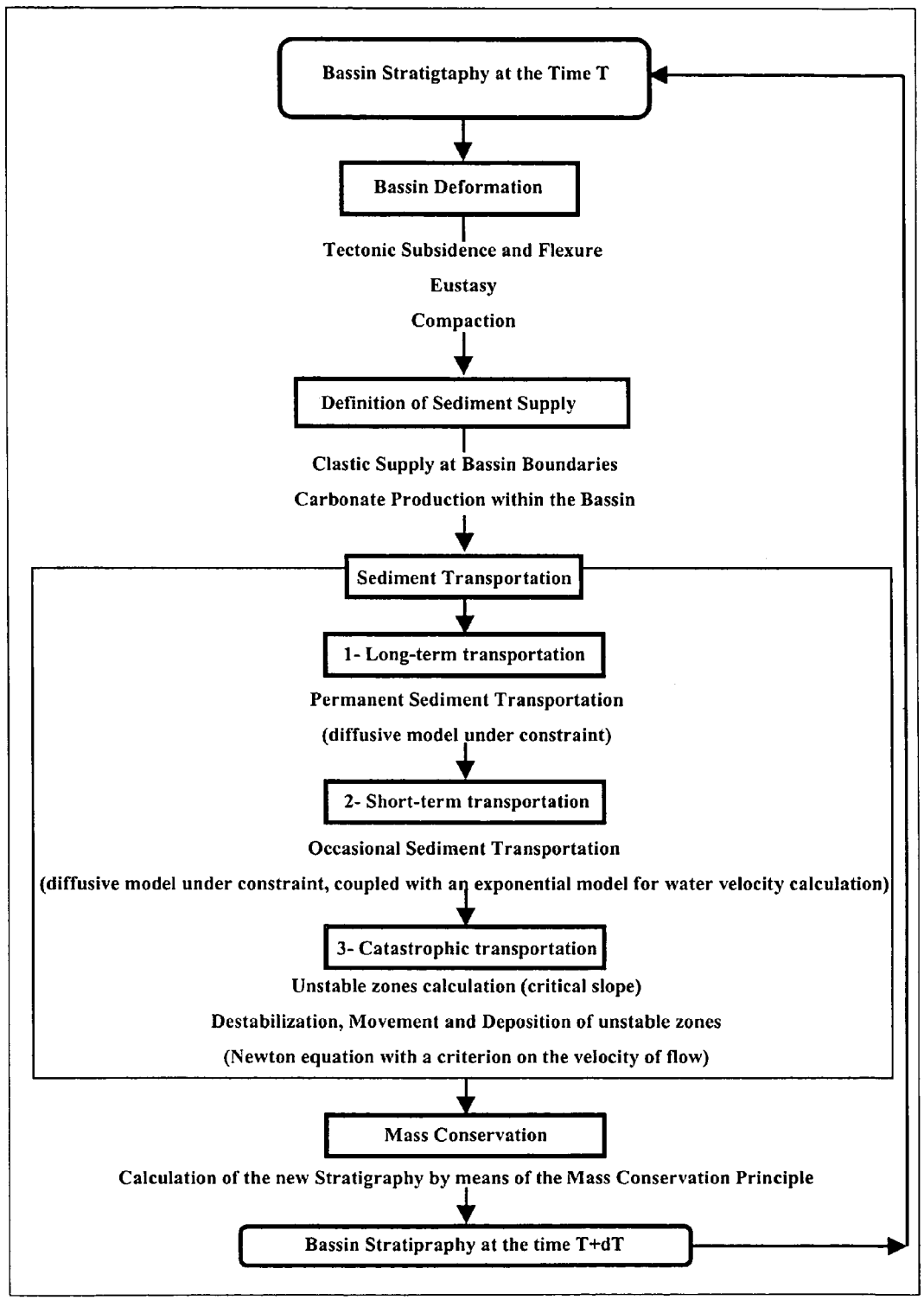
FIG. 1 is a flowchart of the method allowing modelling by successive iterations the stratigraphy of a basin.

As shown by the flowchart in FIG. 1, stratigraphic modelling of the basin is obtained iteratively from the past to the present (or at least to a more recent time) in a series of constant time intervals, of the order of ten to one hundred thousand years. During each time interval, the stratigraphic model calculates the basin deformation and the supply of each lithology, then it quantifies the transportation of each lithology. Application of the mass conservation allows obtaining a new geography and thus ends the time interval.

During a first stage, the accommodation available for the sediments is defined. The sediments are then introduced and sedimentary production in the basin is simulated. These sediments are thereafter distributed in accordance with macrotransportation laws which are defined in the description hereafter by limiting erosion to the weathered layer.

I Accommodation Creation

The accommodation for sedimentary filling of the basin is the sum of the eustasy and of the subsidence. Sedimentary filling defines the basin point by point, either from eustatic curves and subsidence maps, or directly from accommodation maps, therefore without using physical models relating the eustasy to the climate, or the subsidence to tectonic, isostatic or thermal processes.

Although it does not modify the accomodation, compaction influences the sedimentary filling by modifying the thickness of the sedimentary layers. In order to account for mechanical compaction, we have chosen to directly relate the porosity of the sediments to the maximum depth of burial reached by them, by a relation of exponential form allowing to obtain a good approximation of the compaction as defined by:

Parasnis, D. S., 1960, The Compaction of Sediments and its Bearing on Some Geophysical Problems. Journal of the Royal Astronomical Society, Vol.3, No.1, pp; 1–28.

In order to account for the case of multilithologic sediments, the porosity of each lithology is considered independent of the others, which amounts to likening the sedimentary layers consisting of a mixture of several lithologies such as sand and clay to a superposition of multiple sublayers consisting of pure lithologies. The porosity related to each lithology is thus dealt with individually according to the maximum depth of burial reached by the sedimentary layer.

This definition of porosity related to the lithologies allows in particular to simulate the individual transportation of each lithology and to deduce therefrom the consequences on the porosity of the sedimentary layers.

II Introduction and Production of Sediments

The accommodation being created, the second model formation stage consists in introducing sediments in the basin or in producing them in the marine domain.

a) Introduction of Sediments in the Domain Studied

The flows of sediments at the boundaries of the domain studied geologically represent the sediment supply responsible for filling of the basin. The flows can be physically perceived in terms of boundary conditions of the sediment flow.

These boundary conditions are set either by imposing the exact value of the flow at one sector of the boundary, or by imposing a continuous evolution on the sediment flow. The first case represents a supply zone imposed by conditions exterior to the basin, such as the outlet of a river draining a river basin exterior to the basin. The second case represents a free zone along which the sediment flow is governed by physical parameters interior to the basin, such as the characteristics of the waves. When simulating a basin, it is possible to combine these two boundary condition types by distinguishing for example a continental zone where the flow is imposed by the external river supply and a marine zone where the flow is defined by the internal transportation laws.

b) Sedimentary Production in the Domain Studied

The sediments can also be produced within the basin, more particularly in the case of carbonate sediments. For this stage of construction of the model according to the invention, simulation of this production is chosen by means of an empirical formula relating the production rate at each point of the basin to the bathymetry and to the sediment flows as defined for example by:

Lawrence et al., 1990, Stratigraphic Simulation of Sedimentary Basin: Concepts and Calibration in Amer. Assoc. Petrol. Geol. Bull., 74, 3, 273–295.

for each *litho* log $y\,i \Rightarrow \Phi_i = \Phi_{r,i} + (\Phi_{o,i} - \Phi_{r,i})e^{-z/z_i}$ with
$\begin{cases} \Phi_i & \text{porosity of } litho \text{ log } y\,i \text{ (in \%)} \\ \Phi_{r,i} & \text{residual porosity of } litho \text{ log } y\,i \text{ (in \%)} \\ \Phi_{o,i} & \text{deposition porosity of } litho \text{ log } y\,i \text{ (in \%)} \\ z & \text{maximum depth of burial reached by the sedimentary layer studied (in m)} \\ z_i & \text{reference depth of burial of } litho \text{ log } y\,i \text{ (in m)} \end{cases}$ for each *litho* log $y\,i \Rightarrow P_i = P_{o,i} B_i \prod_{j \neq i} F_{j,i}$ with
$\begin{cases} P_i & \text{production rate of } litho \text{ log } y\,i \text{ (in m/s)} \\ P_{o,i} & \text{maximum production rate of } litho \text{ log } y\,i \text{ (in m/s)} \end{cases}$ -continued $$\text{influence of bathymetry } B_i = \begin{cases} 0 & \text{if } b \leq 0 \\ \dfrac{b}{b_i} & \text{if } 0 < b \leq b_i \\ e^{-\beta_i(b-b_i)} & \text{if } b > b_i \end{cases} \begin{cases} B_i & \text{influence of bathymetry (dimensionless)} \\ b & \text{bathymetry (in m)} \\ b_i & \text{bathymetric threshold (in m)} \\ \beta_i & \text{attention coefficient (in m}^{-1}) \end{cases}$$

$$\text{influence of lithology } j \ F_{j,i} = \begin{cases} 1 & \text{if } Q_j \leq S_{j,i} \\ e^{-\gamma_{j,i}(Q_j - S_{j,i})} & \text{if } Q_j > S_{j,i} \end{cases} \begin{cases} F_{j,i} & \text{sensitivity of } litho \text{ log } y \, i \text{ to the flow of } litho \text{ log } y \, j \\ Q_j & \text{flow of } litho \text{ log } y \, j \text{ (in m}^{\ell}/\text{s)} \\ S_{j,i} & \text{initial inhibition threshold (in m}^{\ell}/\text{s)} \\ \gamma_{j,i} & \text{sensitivity coefficient (in m}^{-2} \cdot \text{s)} \end{cases}$$

In order to account for the erosion of reefs when the reefs emerged, the process of mechanical alteration of the reefs has been simulated considering that any reef sediment located in the weathered layer in the continental domain is changed into "bioclastic" sediment. The reef and bioclastic lithologies are transported in the basin like the siliciclastic sediments.

III Sediment Transportation a) Long-term Transportation

Figure 2:
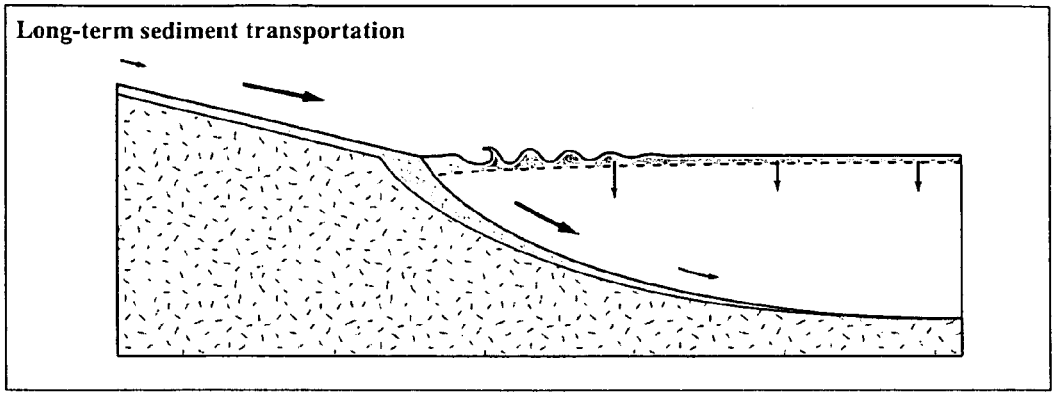
FIG. 2 illustrates the long-term (permanent) transportation mode of the sediments induced by rivers, ocean currents, or the slow action of gravity (creeping, etc.); it is simulated by means of a diffusive model constrained by the water flow and a reduced availability; in marine domains, the fine fraction of the sediments (clayey component) is first carried along by suspension, then reworked by the long-term processes acting on the sea bottom.

Long-term processes correspond to the permanent transportation of sediments, induced by rivers, ocean currents (FIG. 2) or the slow action of gravity (creeping, etc.). Within the scope of the method, these processes can be modelled by a diffusion equation constrained by the water flow and by a reduced availability.

Defining the value of the water flow Qwater at each point M of the basin is the staring point. This calculation is carried out from upstream to downstream, assuming that all of the water reaching a given point of the basin is redistributed to neighboring point downstream from this point, proportionally to the slope; the neighboring point having the steepest slope thus receives more water than the others.

The long-term transportation capacity at any point M of the basin is then calculated. This transportation capacity is defined by a diffusive model constrained by the water flow, that is the transportation capacity for each lithology is defined by the formula as follows:

$$\overrightarrow{Q_{max,litho}} = -(K_{gravity} + K_{river} Q_{water}) \overrightarrow{\text{grad}} \, z$$

with:

Qmax,litho the transportation capacity of the lithology "litho" at M,

Qwater the water stream flowing at the soil surface at M,

Kgravity the diffusion coefficient related to the permanent gravity processes (soil creeping, etc.), Kriver the diffusion coefficient related to the permanent river and ocean transportation, z the altitude of the soil at M.

To define the real flow Qlitho of each lithology transported at point M, the basin is scanned from upstream to downstream. At each point M of this path, the real flow of each lithology provided by the upstream (given that a previous calculation of what was happening upstream from point M) is known.

Furthermore consideration occurs that, locally, erosion cannot exceed a maximum value E defined by the lithology content in the soil (a carbonate reef thus erodes less quickly than a claystone, which erodes less quickly than a sandstone, etc.) and by the bathymetry (erosion being different in the open and in a submarine environment).

The real "outgoing" flow downstream from point M is calculated considering that this flow cannot exceed the maximum transportation capacity downstream from M, and cannot exceed the maximum sediment availability, defined as the sum of the "incoming" flow upstream and of the maximum erosion. Therefore:

$$Q_{litho} = \min(Q_{litho \ upstream} + E_{litho}; \ Q_{max,litho \ downstream}).$$

The assumption is that the flow remains diffusive, that is following the greatest slope. A weighting coefficient $\lambda$ ranging between 0 and 1 is thus defined, such that:

$$\overrightarrow{Q_{litho}} = \lambda \overrightarrow{Q_{max,litho}} = -\lambda(K_{gravity} + K_{river} Q_{water}) \overrightarrow{\text{grad}} \, z$$

b) Short-term Transportation

Figure 3:
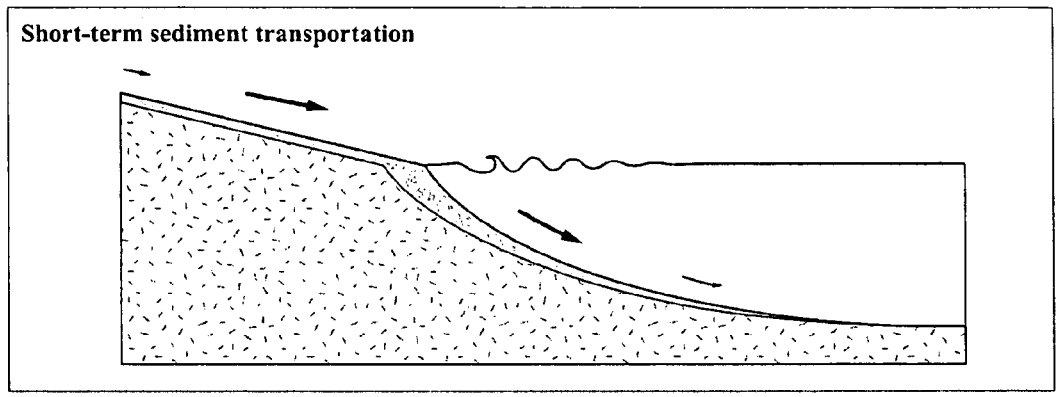
FIG. 3 illustrates the short-term transportation mode of sediments during occasional but intense phenomena such as heavy rain inducing river floods and hyperpycnal currents in marine domains; these processes are modelled by means of a diffusive model constrained by the water flow, the reduced availability and the water velocity; this water velocity is calculated by means of an exponential model.
Figure 4:
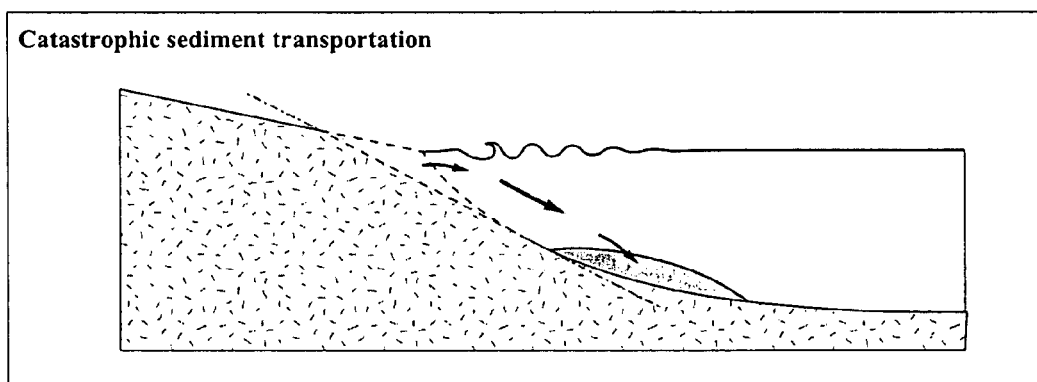
FIG. 4 illustrates the mass or catastrophic transportation mode of sediments after cliff or slope collapse; the unstable zones are first determined by means of a criterion on the slope of the soil; any sediment located above a critical slope is considered to be unstable; it is removed from the soil and displaced by means of Newton's equation (Acceleration=Gravity−Friction), as long as its velocity is above a critical velocity.

Short-term processes correspond (FIG. 3) to the transportation of sediments during occasional but intense phenomena such as heavy rain inducing river floods and hyperpycnal currents in the marine domain. Within the scope of the invention, is consideration that the processes can be modelled by an improved diffusion equation constrained by the water flow, by a reduced availability and by the velocity of flow of the water.

Such an occasional sediment transportation has been the object of many studies for river, coastal and marine engineering problems. The goal of these studies is generally to determine the transportation capacity of a water current in order to know if human installations such as houses, bridges, ports or offshore platforms can withstand such a current. It is generally assumed that a stream can be characterized by three main quantities: its velocity u, its depth h and its width w. It is also generally assumed that the Saint-Venant equations corresponding to the formulation for a fluid of Newton's equation (sum of the forces=acceleration) allow determination of these characteristics at any point of a flow. The Saint-Venant equations are expressed in 2D in the simplified form as follows:

$$\begin{cases} \text{water volume conservation} & \dfrac{dh}{dt} = \dfrac{\partial h}{\partial t} + \dfrac{\partial uh}{\partial x} = 0 \\ \text{momentum and forces balance} & \dfrac{duh}{dt} = \dfrac{\partial uh}{\partial t} + \dfrac{\partial u^2 h}{\partial x} = ghS - Cu^2 \end{cases}$$

where S represents the slope of the soil surface and C the coefficient of friction of the water against the soil.

Solution of these equations over very great lengths of time (ten to several hundred thousand years) and over very large distances (several tens to hundreds of kilometers) poses considerable numerical problems for practical application. The main problem is the calculating time required to solve these equations. It can come to several days for a single time interval. A stratigraphic simulation would therefore last for weeks.

To overcome this major obstacle, the method provided greatly simplifies calculation of the velocity of the water.

First consideration is that an equilibrium regime exists virtually. This equilibrium regime is defined by the uniform permanent solution of the above equations. An equilibrium velocity Ue, an equilibrium height He and an equilibrium distance Le are defined by:

$$U_e = \left(\frac{Q_{water}gS}{C}\right)^{1/3}$$

$$H_e = \frac{Q_{water}}{U_e} = \left(\frac{CQ_{water}^2}{gS}\right)^{1/3}$$

$$L_e = \frac{Q_{water}}{3U_eC} = \frac{H_e}{3C}$$

The velocity of a stream is connected to try at any point to return to an equilibrium velocity. This evolution tendency is assumed to follow an exponential model:

$$\frac{\partial U(M)}{\partial \xi} = \frac{U_e}{L_e}$$

where $\xi$ is the distance along the flow.

In cases where the equilibrium velocity and distance remain substantially uniform between a reference point and point M, the above relation leads to the exponential model as follows:

$$U(M) = U_e + (U_o - U_e)e^{-\xi/L_e}$$

where $U_o$ represents the velocity at a reference point of the flow.

Furthermore consideration is given that the velocity of the water acts as a weighting coefficient P(U) of the velocity model, according to the relation as follows:

$$\overrightarrow{Q_{max,litho}} = -(K_{gravity} + K_{river}Q_{water}P(U))\overrightarrow{grad z} \text{ with}$$

$$P(U) = \left(\frac{U^2 - U_{c,litho}^2}{U_e^2}\right)^{3/2} \text{ if } U > U_{c,litho} \text{ and}$$

$$P(U) = 0 \text{ if } U < U_{c,litho}$$

where P(U) is the weighting coefficient depending on the velocity U of the flow, on the critical velocity Uc,litho from which the lithology "litho" can be transported and on the equilibrium velocity Ue.

Finally the availability rule given above concerning long-term transportation to constrain and quantify the real flow of sediments transported by an occasional stream is applied.

c) Catastrophic Transportation

Catastrophic processes correspond to the mass transport of sediments after cliff or slope collapse. The unstable zones are first determined by applying a critical slope criterion. This critical slope varies locally and depends on the lithologic nature of the sediments in the soil.

Any unstable zone is then mass displaced by applying Newton's equation: the collapse acceleration is equal to the sum of the forces applied (gravity and friction). This equation allows moving each collapse through the basin. The collapse is considered to be frozen as soon as its velocity decreases below a critical threshold.

d) Numerical Solution

Realization of the model according to the invention comprises numerical solution of the transportation equations based on spatial discretization of the basin studied and temporal discretization of the formation.

The basin studied is split up into square grid cells of constant size, and filling of this grid pattern is simulated in a succession of calculating times separated by a constant time interval. The width of the grid cells is for example of the order of 1 to 10 kilometers depending on the basin simulated, and the time interval is of the order of 50,000 years.

The transportation equations are then solved by means of an explicit numerical scheme where the physical parameters such as the flow or the altitude at the time (n+1) are expressed as a function of parameters measured at the time (n) and whose values are thus known.

In the two-dimensional monolithologic case, this solution is expressed as follows:

$$Q = -K\frac{\partial h}{\partial x} \Rightarrow \text{at each grid cell } i \, Q_i^{(n+1)} = -K_i^{(n)}\frac{h_{i+1}^{(n)} - h_i^{(n)}}{dx} \quad (1)$$

$$\frac{\partial h}{\partial t} = -\frac{\partial Q}{\partial x} \Rightarrow \text{at each grid cell } i \, \frac{h_i^{(n+1)} - h_i^{(n)}}{dt} \quad (2)$$

$$= -\frac{Q_i^{(n+1)} - Q_{i-1}^{(n+1)}}{dx}$$

$$\text{i.e. } h_i^{(n+1)} = h_i^{(n)} + \frac{dt}{dx^2}\left(K_i^{(n)}\frac{h_{i+1}^{(n)} - h_i^{(n)}}{dx} - K_i^{(n)}\frac{h_i^{(n)} - h_{i-1}^{(n)}}{dx}\right)$$

with $$\begin{cases} h_i^{(n)} & \text{altitude of grid cell } i \text{ at the time } n \text{ (in m)} \\ K_i^{(n)} & \text{diffusion coefficient at grid cell } i \text{ (in m}^2\text{/s)} \\ Q_i^{(n)} & \text{sediment flow between grid cells } i \text{ and } i+1 \text{ (in m}^2\text{/s)} \\ dt & \text{time interval (in s)} \\ dx & \text{grid cell width (in m)} \end{cases}$$

This rather simple writing however becomes more complex when switching to multilithology and 3D and when taking account of the restriction of sediment transportation to the weathered layer. In this case, its writen:

$$\frac{\partial h}{\partial t} = -V_i \max, \text{ i.e.}$$

$$h_i^{(n+1)} = h_i^{(n)} - V_i \cdot dt$$

Explicit finite-volume solution is the fastest calculating method. It furthermore provides very precise results within the stability range of the algorithm, which requires very small internal calculation time intervals, of the order of one century to one millennium.

Application of the model to the input data formed from the field data allows simulation of the transportation of sediments throughout the studied basin. The simulation validity is then tested by comparing the results provided by the model with the data collected in the field, and mainly the sediment thicknesses and the facies observed in the well logs. In the case of a disagreement, the set of input parameters of the model: accommodation and amount of sediments transported is sought by inversion such that the difference between the results obtained by these parameters and the constraints applied is minimal, as schematized hereafter.

$$\text{direct model} \Rightarrow S = M(p)$$

$$\text{deviation function} \Rightarrow E(p) = \|S - C\|$$

with $$\begin{cases} p & \text{set of input parameters of the model} \\ M & \text{set of equations governing the model} \\ S & \text{set of results at the model output} \\ C & \text{set of geologic constraints} \\ E & \text{deviation function between results and constraints} \\ \|x\| & \text{measurement of the deviation between results and constraints} \end{cases}$$

$$\text{inversion} \Rightarrow \text{find } \tilde{p} \text{ such that}$$

$$\tilde{E} = E(\tilde{p}) \text{ is the absolute minimum of function } E$$

$$\forall\, p, E(p) \geq \tilde{E}$$

Within the context of the present invention, the goal of inversion is thus to quantify in particular the values of accommodation, of the sediment supply and of the diffusion coefficients in order to obtain a simulation whose sedimentary body geometries, thicknesses and facies measured at the level of the calibration wells are as close as possible to the geologic constraints.

A trial-and-error type inversion method is used. An initial set of parameters is defined. The solution of the model related to these parameters is calculated and the value of the parameters is modified as a function of the difference between the solution and the geologic constraints. This procedure is continued until the difference becomes sufficiently small.

The agreement optimum being reached, the simulation leads to quantitative data on the geometry of the basin and on the lithologies of the sedimentary units. It also allows checking the coherence of the well correlation scheme.

IV Industrial Validation of the Model Obtained

The validity of the model thus formed has been tested on simple two or three-dimensional theoretical cases. The subsidence velocity, the sediment supply rate and the sediment diffusivity were for example assumed to be constant. By defining the eustasy according to one or two cyclicity orders, we have thus been able to show, by means of these simple but realistic cases, that the diffusive model allows restoring the implications of the genetic stratigraphy concepts, such as volumetric partitioning of the sediments in a genetic unit and distortion of the genetic units. The geologic coherence of these simulation results allows empirically validating the use of the multilithologic diffusion equation over long time and space scales.

The model has also been tested on current and old real cases, in various sedimentary contexts, within the scope of theses and projects in collaboration with oil companies. The tests were notably carried out on:

(1) siliciclastic systems (sand, clay, . . . ) in shallow deltaic to marine environments (bathymetry<200 m):

Mesa Verde formation, San Juan basin in Colorado, USA (basin length=200 km, duration of the formation studied=10 Ma), Brent formation, North Sea (basin surface area=250×350 km$^2$, duration of the formation studied=12 Ma), Tertiary and Quaternary formations, at the mouth of the Red River in Vietnam (basin surface area=120×90 km$^2$, duration of the formation studied=30 Ma), Secondary to Quaternary formations, Colorado basin, off Argentina (basin surface area=200×200 km$^2$, duration of the formation studied=240 Ma), (2) turbiditic siliciclastic systems (sand, clay, . . . ) in shallow to very deep marine environments (bathymetry up to 1000 m):

Pab formation, in Pakistan (basin surface area=90×110 km$^2$, duration of the formation studied=3 Ma), formation of Eocene age, along the Brazilian margin (basin surface area=40×80 km$^2$, duration of the formation studied=15 Ma), the formation of Eocene age of the Annot sandstone, in the South of France (basin surface area=20×40 km$^2$, duration of the formation studied=15 Ma), (3) pure carbonate systems (coral and rudistid reefs, deep-sea ooze, . . . ) in shallow marine environments:

Natih formation, in Oman (basin surface area=200×200 km$^2$, duration of the formation studied=10 Ma), Khuf formation, in Saudi Arabia (basin surface area=250×250 km$^2$, duration of the formation studied=50 Ma), The Tortonian and Messinian formations forming the Balearic islands (basin surface area=80×108 km$^2$, duration of the formation studied=6 Ma), mixed carbonate systems (sand and clay interacting with coral and rudistid reefs, deep-sea ooze, etc.) in shallow marine environments, Miocene formation in Turkey (basin surface area=40×40 km$^2$, duration of the formation studied=5 Ma), lower Cretaceous formations, in Oman (basin surface area=100×200 km$^2$, duration of the formation studied=17 Ma).

These applications allow showing that the diffusive model presented within the scope of the present invention allows obtaining very precise simulations, with a mean deviation of the cumulative thicknesses of the sediments of the order of 5 meters to 25 kilometers of the constraint wells (for a formation having a mean thickness of the order of 100 meters), and a difference between the position of the simulated and observed shores below 10 kilometers (the size of the calculating grid cells being 10 kilometers).

As a result of this geometric and faciologic restoration, and of the access to the large-scale physics of the sedimentary processes, the diffusive model according to the invention allows going back to the geologic databases by refining for example the value of the bathymetries and of the sediment flows, by restoring the accommodation evolution in time and by confirming or invalidating the selection of a correlation scheme.

The invention claimed is:

1. A method for forming a diffusive type deterministic model for simulating multilithologic filling of a sedimentary basin, comprising:

from known field data relative to an architecture of the basin and measured data or seismic data, forming a set of input data relative to an accommodation available through subsidence and eustasy, to a supply of fluvial or marine sediments and transportation thereof, and to physical parameters of lithologies, by an iterative process involving gridding the basin into grid cells of regular dimensions, modelling according to an explicit finite-volume scheme with constant time intervals, to simulate flow of each lithology deposited on each grid cell; and comparing simulation results with the data and modifying the set of input data step by step by inversion; and wherein for each time interval and for each lithology modelling by deterministic equations respectively a) a mean of a transportation processes acting on a permanent and continuous basis for a longer term, b) a mean of transportation processes acting on a permanent and continuous basis for a shorter term, and c) a mean of a transportation processes acting in a catastrophic way for a term less than the shorter term; and determining a resulting stratigraphy of the basin by accounting for the mass conservation.

2. A method as claimed in claim 1, comprising, in each time interval and for each lithology:

modelling the longer-term flows of sediments carried by water by accounting for a model of a distribution of water flowing in the basin and of the sediment transportation capacity of the water flowing in the basin;

modelling the shorter-term flows of sediments carried by water using an exponential model for estimating water velocity; and modelling catastrophic flows of sediments carried by water in unstable zones located by applying a critical slope criterion.

3. A method as claimed in claim 1, wherein in the longer-term flows are modelled by the relation as follows:

$$\overrightarrow{Q_{litho}} = \lambda \overrightarrow{Q_{max,litho}} = -\lambda(K_{gravity} + K_{river}Q_{water})\overrightarrow{grad z}$$

where:
Qmax,litho is transportation capacity of the lithology at any point of the basin;
Qwater is a water stream flowing at the soil surface at a point;
Kgravity is a diffusion coefficient related to permanent gravity processes;
Kriver is a diffusion coefficient related to permanent river and ocean transportation;
z is an altitude of the soil at a point; and
$\lambda$ is a weighting coefficient.

4. A method as claimed in claim 2, wherein in the longer-term flows are modelled by the relation as follows:

$$\overrightarrow{Q_{litho}} = \lambda \overrightarrow{Q_{max,litho}} = \lambda(K_{gravity} + K_{river}Q_{water})\overrightarrow{grad z}$$

where:
Qmax,litho is transportation capacity of the lithology at any point of the basin;
Qwater is a water stream flowing at the soil surface at a point;
Kgravity is a diffusion coefficient related to permanent gravity processes;
Kriver is a diffusion coefficient related to permanent river and ocean transportation;
z is an altitude of the soil at a point; and
$\lambda$ is a weighting coefficient.

5. A method as claimed in claim 1, wherein the shorter-term flow of sediment carried by water is modelled by applying an exponential model for water velocity comprising:

$$U(M) = U_e + (U_o - U_e)e^{-\xi/L_e}$$

where Uo represents velocity at a reference point of the flow of sediment carried by water, Ue is a water equilibrium velocity, and $\xi$ is a distance along the flow of sediment carried by water, the flows of sediment carried by water being estimated by a relation:

$$\overrightarrow{Q_{max,litho}} = -(K_{gravity} + K_{river}Q_{water}P(U))\overrightarrow{grad z}$$

with $P(U) = \left(\dfrac{U^2 - U_{c,litho}^2}{U_e^2}\right)^{3/2}$ if $U > U_{c,litho}$ and $P(U) = 0$ if $U < U_{c,litho}$ where P(U) is a weighting coefficient of a velocity model depending on a velocity U of the flow of sediment carried by water, of a critical velocity Uc,litho from which each lithology can be transported.

6. A method as claimed in claim 2, wherein the shorter-term flow of sediment carried by water is modelled by applying an exponential model for water velocity comprising:

$$U(M) = U_e + (U_o - U_e)e^{-\xi/L_e}$$

where Uo represents velocity at a reference point of the flow of sediment carried by water, Ue is a water equilibrium velocity, and $\xi$ is a distance along the flow of sediment carried by water, the flows of sediment carried by water being estimated by a relation:

$$\overrightarrow{Q_{max,litho}} = -(K_{gravity} + K_{river}Q_{water}P(U))\overrightarrow{grad z} \text{ with}$$

$P(U) = \left(\dfrac{U^2 - U_{c,litho}^2}{U_e^2}\right)^{3/2}$ if $U > U_{c,litho}$ and $P(U) = 0$ if $U > U_{c,litho}$ where P(U) is a weighting coefficient of a velocity model depending on a velocity U of the flow of sediment carried by water, of a critical velocity Uc,litho from which each lithology can be transported.

* * * * *